United States Patent [19]

Barry

[11] 4,269,378

[45] May 26, 1981

[54] CABLE CONNECTOR

[76] Inventor: Robert L. Barry, 416 Giovanni Dr., Nokomis, Fla. 33555

[21] Appl. No.: 91,711

[22] Filed: Nov. 6, 1979

[51] Int. Cl.$^3$ .............................................. F16L 5/00
[52] U.S. Cl. ................................. 248/56; 174/153 G
[58] Field of Search ............ 248/74 R, 56, 73, 74 A, 248/74 B, 74 PB; 24/16 PB, 73 CC, 73 SA, 73 PB, 81 CC; 174/153 R, 153 G; 285/158

[56] References Cited

U.S. PATENT DOCUMENTS

| | | | |
|---|---|---|---|
| 2,424,804 | 7/1947 | Swart | 174/153 R |
| 3,497,923 | 3/1970 | Seckerson | 248/56 X |
| 3,906,586 | 9/1975 | Arnold | 174/153 G X |
| 3,991,446 | 11/1976 | Mooney | 174/153 G X |
| 4,033,535 | 7/1977 | Moran | 248/56 |

Primary Examiner—J. Franklin Foss
Attorney, Agent, or Firm—R. Lewis Gable

[57] ABSTRACT

A cable or elongated member connector is disclosed as comprising a pair of legs interconnected by a bite portion having an aperture therein for receiving a cable therethrough. At the unattached end of each leg, there is disposed a foot for engaging the inner periphery of the aperture and a shielding member. A detent is disposed upon the inner surface of each leg between the foot and the bite portion, for engaging the outer peripheral surface of the cable to retain the cable to the connector. When the connector's feet are disposed to engage the panel aperture, the shielding members are disposed about the cable to form a shield over the panel aperture to prevent the introduction of extraneous material within the panel.

8 Claims, 3 Drawing Figures

CABLE CONNECTOR

DESCRIPTION

1. Technical Field

This invention relates to apparatus for positioning and retaining a cable or elongated member with respect to an aperture in a panel.

2. Background of the Prior Art

It is known to provide a resilient clip taking the form of a grommet to locate and hold a cable in position with respect to an aperture of a panel. Such a resilient clip functions to position or center the cable with respect to the aperture as well as to retain the cable with respect to the panel so that as force is exerted upon the cable, it will not be withdrawn from the panel. U.S. Pat. No. 3,497,923 of Seckerson describes such a resilient clip comprising a pair of flat limbs interconnected by a bowed web. The bowed web has an aperture therein for receiving the cable with its two limbs splayed outwardly therefrom. At the end of each of the limbs is a foot which serves, upon compressing the limbs toward the cable, to engage the outer surface of the cable. In order to locate the cable within the aperture of the panel, the cable is first disposed through the web aperture and the limbs are compressed toward each other so that each of its feet engage in a retaining fashion the outer surface of the cable. More specifically, the cable and bowed web of the cable clip are disposed through the aperture of the panel, thereby disposing the clip's limbs toward each other. Each of the limbs has a further set of detents disposed to engage the inner periphery of the panel's aperture. Thus, upon insertion of the clip into the panel's aperture, the periphery of the aperture engages the limbs depressing them towards each other so that the limb's feet engage in a retaining fashion the cable therebetween; at the same time, the clip is inserted sufficiently that the aforementioned detents engage the periphery of the aperture to retain the clip within the aperture while insuring that the limbs engage and hold the cable.

Such a clip has the disadvantage that the inwardly turned feet tend to cut the exterior surface of the cable. It is also desired to place a greater retaining pressure against the surface of the cable to more surely hold the cable without adversely affecting or cutting its surface. In addition, it is desired to provide means for covering or shielding the aperture once a clip has been disposed therein.

BRIEF SUMMARY OF THE INVENTION

It is therefore an object of this invention to provide a new and improved elongated member connector that is capable of retaining the cable more effectively and in particular to exert greater pressure upon its outer periphery.

It is a further object of this invention to provide a new and improved elongated member connector that upon insertion within an aperture of a panel, covers the aperture to prevent the introduction of extraneous material within the panel.

In accordance with these other objects, there is provided a cable or elongated member connector comprising a pair of legs interconnected by a bite portion having an aperture therein for receiving a cable therethrough. At the unattached end of each leg, there is disposed a foot for engaging the inner periphery of the aperture and a shielding member. A detent is disposed upon the inner surface of each leg between the foot and the bite portion, for engaging the the outer peripheral surface of the cable. The cable is inserted through the web aperture and the legs are depressed from a first, released position toward each other to a second, compressed position, wherein the detents disposed on opposite sides of the cable engage the outer peripheral surface of the cable in a manner to retain the cable to the connector. Next, the connector in its second, compressed condition is inserted through the panel's aperture and then released to permit its feet to engage the inner periphery of the panel's aperture. In this position, the shielding members are disposed about the cable in a manner to form a shield to prevent the introduction of extraneous material within the panel.

A significant aspect of this invention resides in the placement of the detents to achieve a greater retention of the cable to the connector. In particular, at least one of the detents is placed in a position relatively close to the bite portion to facilitate a lever action whereby the force exerted by the aperture upon one end of an arm is transmitted to the detent to exert an increased force upon the peripheral surface of the cable, thereby increasing the force that retains the cable to the connector.

BRIEF DESCRIPTION OF THE DRAWINGS

These and other objects and advantages of the present invention will become more apparent by referring to the following detailed description and the accompanying drawings, in which.

DESCRIPTION OF THE PREFERRED EMBODIMENT

Figure 1:
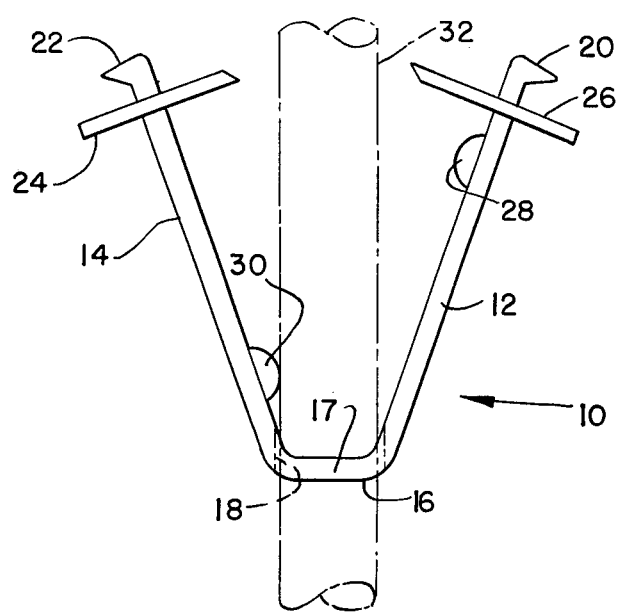
FIG. 1 is a side view of the cable connector of this invention with a cable (shown in phantom line) inserted therein.

Referring now to the drawings, and in particular to FIG. 1, there is shown a cable connector 10 in accordance with the teachings of this invention comprising a pair of arms 12 and 14, shown in their first or released position, without pressure being applied thereto. The arms 12 and 14 are interconnected by a bite portion 17 having an aperture 18 disposed centrally therethrough. In an illustrative embodiment of this invention, the arms 12 and 14, and the bite portion may be made of a single strip of metal which, during manufacture, is rendered resilient and preferably rust-proof. It is also contemplated that within the teachings of this invention that the cable connector 10 could be made, e.g., molded, of a resilient plastic material such as vinyl. The aperture 18 is of a size to permit insertion therethrough of a cable or elongated member 32. As shown in FIG. 1, the arms 12 and 14 in their first, released position are disposed at an angle with respect to the axis of the cable 32.

Figure 3:
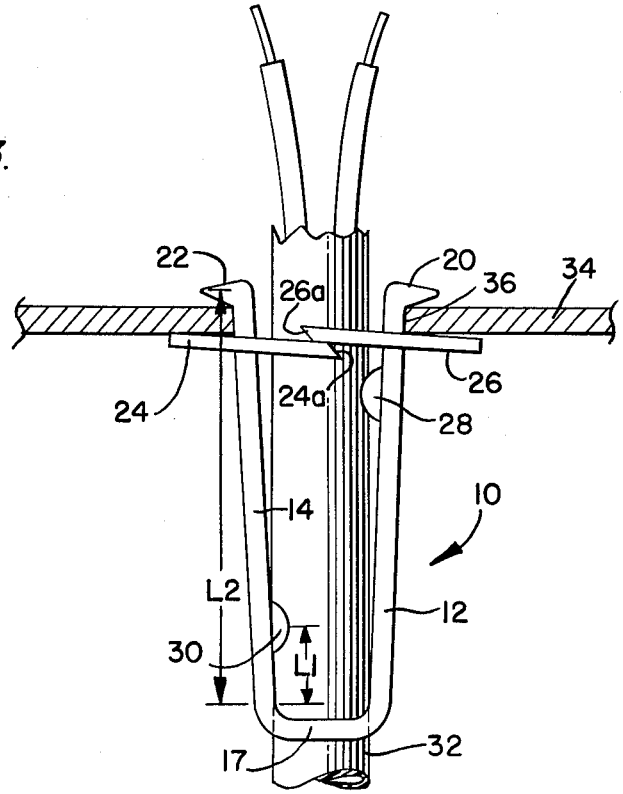
FIG. 3 is a side view of the cable connector shown in FIG. 1 showing a manner in which the cable connector is compressed together to permit its insertion within a panel aperture.

A foot 20 or 22 is disposed at the end of each of the arms 12 and 14, respectively, pointing outward to engage, as will be explained, an aperture 36 within a panel 34. Further, each of the legs 12 and 14 includes a detent 28 or 30, respectively, disposed as shown in FIG. 1, to engage the peripheral surface of the cable 32, when the legs 12 and 14 are disposed to their second, compressed position as shown in FIG. 3. As will be explained, the position with respect to the ends of each leg 12 and 14 and to the bite portion 17 are designed to increase the force exerted by the detents 28 and 30 upon the cable 32, thereby assuring the more secure retention of the cable 32 to the cable connector 12.

Figure 2:
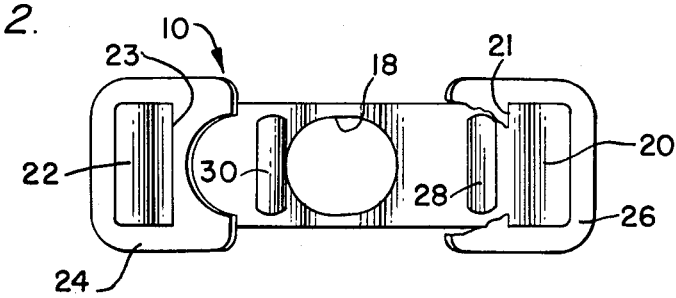
FIG. 2 is a plan view looking at the interior surface of the cable connector, as shown in FIG. 1, particularly showing the placement of the inner detents and its aperture.

One of a pair of shield members 24 and 26, as shown in FIGS. 1 and 2, is disposed at the end of each of the arms 12 and 14, respectively. Apertures 21 and 23 are disposed in each of the shield members 26 and 24, respectively, to permit play in the position of the shield members with respect to the arms. In the illustrative embodiment, wherein the unitary member comprising the arms 12 and 14 and the bite 17 is made of a metal, it is contemplated that the shield members 24 and 26 are first disposed upon the ends of the arms 14 and 12, respectively, before the ends thereof are crimped to form the feet 20 and 22, respectively.

To insert and retain the cable 32 with respect to the panel 34, as shown in FIG. 3, the arms 12 and 14 of the cable connector 10 are disposed from their first, released position, as shown in FIG. 1, to their second, compressed position, as shown in FIG. 3, by exerting pressure upon the legs 12 and 14 thus disposing them toward each other and engaging the detents 30 and 28 with the peripheral surface of the cable 32; as a result, the cable 32 is retained and held with respect to the cable connector 10. The arms 12 and 14 are pressed toward each other to an extent to permit the feet 20 and 22 to be inserted through the aperture 36 of the panel 34, before releasing the arms 12 and 14 to permit the arms 12 and 14 to splay out slightly whereby the feet 20 and 22 engage the inner periphery of the aperture 36 to thereby retain and hold the cable connector 10 to the panel 34. Thus, if forces are exerted upon the cable, by pulling for example, these forces are not transmitted through the cable to potentially disrupt or break the connection of the cable's conductors with the electrical elements housed in the panel 34.

A particular advantage of this invention is illustrated in FIG. 3 wherein it is shown that each of the shield members 26 and 24 have beveled edges 26a and 24a, respectively, that permit the sliding over and under each other as the arms 12 and 14 and thus the shield members 26 and 24 are disposed toward each other. Thus, when the cable connector 10 is disposed in its second, compressed position as shown in FIG. 3, the ends of the shield members 26 and 24 overlap each other to form an effective shielding means whereby the aperture 36 is covered or shielded to prevent the introduction of extraneous material within the panel 34.

FIG. 3 further illustrates the mechanism by which an increased pressure or force is exerted by the detents 26 and 30 upon the outer peripheral surface of the cable 32. As shown, a leverage action is implemented by the cable connector 10 to permit the force exerted by the inner periphery of the aperture 36 upon the outer end of one of the arms 12 or 14 to be applied with increased effect to its corresponding detent 28 and 30. In particular, the force that is exerted upon the upper end of the arm 14, which forms a lever arm $L_2$ pivoting about its end formed at the juncture of the arm 14 and the bite portion 17; a second pivot arm $L_1$ is formed between the juncture and the detent 30 whereby the force applied at the end of the arm 14 is increased in accordance with the ratio of $L_2$ to $L_1$, and the detent 30 more effectively engages and secures the cable 34 to the cable connector 10.

Thus, there has been shown a new and improved cable connector overcoming the difficulties encountered in the prior art. First, the cable connector of this invention implements a lever action whereby a force is transmitted along the length of an arm of the cable connector to the detent in a manner permitting a leverage mechanism to increase the force exerted by the detent upon the peripheral surface of the cable. Secondly, the cable connector includes shield means, comprised illustratively of a pair of shield members disposed on each arm of the cable connector, that upon disposition to a second, compressed position of the cable connector overlap with each other to form the shield means covering the panel aperture.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

I claim:

1. Apparatus for retaining securely an elongated member in position through an aperture in a panel, said apparatus comprising:
   (a) a pair of arms, each arm having first and second ends;
   (b) a bite portion interconnecting said arms together at their first ends;
   (c) each of said arms having a foot disposed at its second end for engaging said aperture to releasably secure said retaining apparatus to said panel; and
   (d) detent means disposed upon at least one of said pair of arms between its first and second ends in a manner to transmit a force exerted upon its second end with increased effect by said one arm acting as a lever to said dent means, whereby said detent means more securely retains said elongated member to said retaining apparatus.

2. Retaining apparatus as claimed in claim 1, wherein there is included second detent means disposed on the other of said pair of arms between its first and second ends in an opposing relationship to said first-mentioned detent means.

3. Retaining apparatus as claimed in claim 1, wherein said bite portion comprises an aperture therethrough for receiving said elongated member.

4. Retaining apparatus as claimed in claim 1, wherein there is included a pair of shielding members, each shielding member disposed about a corresponding one of said pair of arms.

5. Apparatus for retaining securely an elongated member in position though an aperture of a panel, said apparatus comprising:
   (a) a pair of arms, each arm having first and second ends and made of a resilient material;
   (b) a bite portion interconnecting said pair of arms together at their second ends, each of said pair of arms being disposable from a first unflexed position toward each other to a second compressed position, wherein said pair of arms may be disposed through said aperture;
   (c) each of said arms having a foot disposed at its second end for engaging said aperture to releasably secure said retaining apparatus to said panel; and (d) a pair of shielding members each disposed about a corresponding one of a pair of arms and being configured to cover and shield said aperture when said pair of arms are disposed in the second position and said feet are disposed to engage said aperture in a retaining relationship.

6. Retaining apparatus as claimed in claim 5, wherein each of said shielding members has an edge disposed in an opposing relationship to the edge of the other of said shielding members and being configured to a similar configuration to that of said elongated member.

7. Retaining apparatus as claimed in claim 6, wherein each of said edges of said shielding members is beveled to permit one shielding member to slide over the other as said pair of arms are disposed from their first to second positions.

8. Retaining apparatus as claimed in claim 5, wherein at least one of said pair of arms includes detent means disposed between its first and second ends in a manner to transmit a force exerted upon its first end with increased effect to said detent means whereby said detent means more securely retains said elongated member to said retaining apparatus.

* * * * *